United States Patent [19]
Greger

[11] 3,771,092
[45] Nov. 6, 1973

[54] CONTACTLESS SWITCHING DEVICE
[75] Inventor: Karl Greger, Amberg, Germany
[73] Assignee: Siemens Aktiengesellschaft, Berlin and Munchen, Germany
[22] Filed: Nov. 22, 1971
[21] Appl. No.: 200,769

[30] Foreign Application Priority Data
Nov. 23, 1970 Germany.................. P 20 57 483.8

[52] U.S. Cl. .............................. 338/32 R, 323/94 H
[51] Int. Cl. .............................................. H01c 7/16
[58] Field of Search ...................... 338/32 R, 32 H; 323/94 H; 324/45, 46

[56] References Cited
UNITED STATES PATENTS
3,530,317 9/1970 Lang ............................ 338/32 R X
3,305,717 2/1967 Weiss ............................ 338/32 R X
3,309,642 3/1967 Grancoin .......................... 338/32 H Primary Examiner—C. L. Albritton
Attorney—Arthur E. Wilfond et al.

[57] ABSTRACT

A contactless switching device has a permanent magnet which is rotatably mounted so that it is movable relative to a magnetic field dependent resistance which is located between the return poles of a return yoke. The permanent magnet is rotatably mounted in the manner of a rotatably mounted coil between the return poles of the return yoke and is magnetized in a diameter of the circle of rotation. Rotation of the permanent magnet varies the component of the magnetic field effective via the return poles between a maximum and substantially zero.

6 Claims, 6 Drawing Figures

CONTACTLESS SWITCHING DEVICE

The invention relates to a contactless switching device.

The contactless switching device of the invention has a permanent magnet which is movable relative to a magnetic field dependent resistance or field plate located in a return yoke. The direction of motion of the rotatably mounted permanent magnet is transverse to the axis of magentization of said permanent magnet.

In a known embodiment of a switching device of the aforedescribed type, the permanent magnet is movably mounted in a frame-like return yoke. The magnetic field dependent resistance or field plate is inserted between the permanent magnet and the return yoke, so that the field plate is penetrated by the magnetic flux more or less strongly, dependent upon the position of the permanent magnet. A switching device of this type is disclosed in German Published Patent Application No. 1,916,336.

In the aforedescribed known embodiment of the switching device, the effective flux of the permanent magnet is utilized relatively well and the dimensions of the device may be relatively small. It is impossible, however, to vary the magnetic field in a sufficiently wide range in the known switching device.

The principal object of the invention is to provide a contactless switching device of simple components having small dimensions which varies the magnetic field in the magnetic field dependent resistance within the widest possible range.

Another object of the invention is to provide a contactless switching device of simple structure which functions with efficiency, effectiveness and reliability and provides a maximum range of variation of the magnetic field.

In accordance with the invention, the permanent magnet is rotatably mounted in the manner of a rotatably mounted coil between two return poles of the return yoke and is magnetized in a diameter of the circle of rotation. The magnetic field dependent resistance is located between the return poles of the return yoke.

The permanent magnet may have the configuration of a cylinder. In such case, it is advantageous that the return poles of the return yoke be in contact with the surface of the permanent magnet, on the one hand, and with the magnetic field dependent resistance, on the other hand. This makes it possible to keep additional bearing elements for the permanent magnet and the return poles, as well as between the magnetic field dependent resistance and the return poles, as small as possible.

An additional reduction in size of the switching device of the invention may be provided if the return poles comprise a substantially U-shaped configuration having a back and extending in the direction of the axis of the permanent magnet. The magnetic field dependent resistance is then located in the back of the U-shaped configuration adjacent one end face of the permanent magnet. This makes it possible to keep practically all stray flux away from the magnetic field dependent resistance or field plate when said magnetic field dependent resistance is not supposed to be penetrated by a magnetic field.

In order to strongly concentrate the magnetic flux in the magnetic field dependent resistance, it is advantageous that the return poles of the return yoke have pole pieces in the area of the magnetic field dependent resistance. In order to reliably secure the magnetic return for the permanent magnet without influencing the magnetic field dependent resistance, it is advantageous that the angular range of the circle of rotation covered by the return poles of the yoke totals approximately 150°.

In order that the invention may be readily carried into effect, it will now be described with reference to the accompanying drawings, wherein.

In the FIGS., the same components are identified by the same reference numerals.

Figure 1:
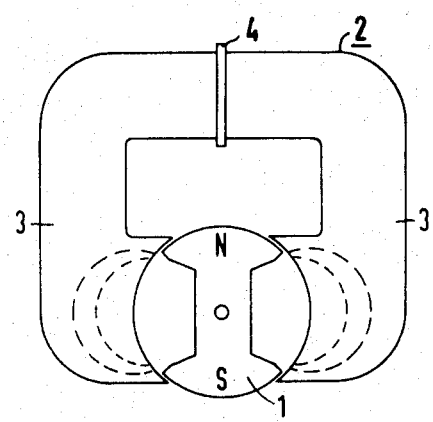
FIG. 1 is a schematic diagram of an embodiment of the contactless switching device of the invention in which a double T-shaped permanent magnet is shown in inoperative position, that is, with the magnetic flux not flowing through the magnetic field dependent resistance.
Figure 2:
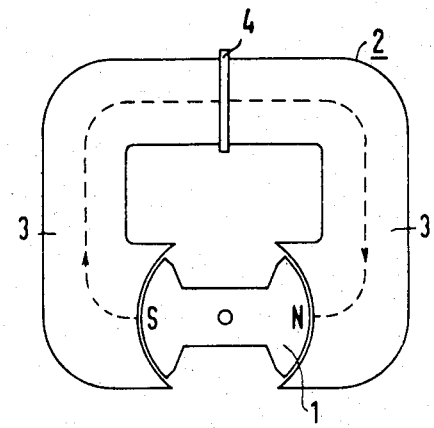
FIG. 2 is a schematic diagram of the contactless switching device of FIG. 1 in which the permanent magnet is in operative position wherein magnetic flux flows through the magnetic field dependent resistance.
Figure 3:
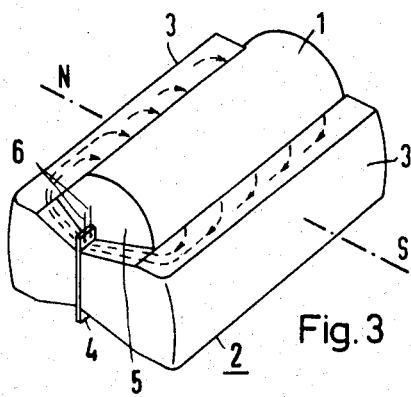
FIG. 3 is a perspective schematic diagram of another embodiment of the contactless switching device of the invention in which a cylindrical permanent magnet is in a position which magnetically influences the magnetic field dependent resistance.
Figure 4:
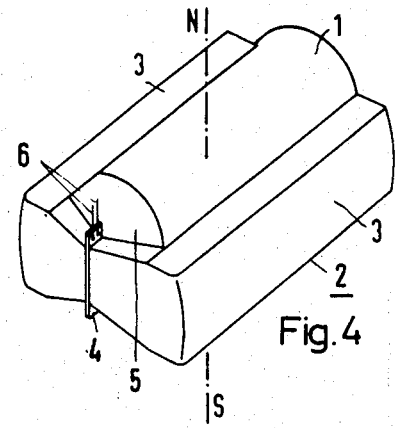
FIG. 4 is a perspective schematic diagram of the contactless switching device of FIG. 3 in which the permanent magnet is in a position which is rotated 90° from the position shown in FIG. 3.

In the embodiment of FIGS. 1 and 2 and the embodiment of FIGS. 3 and 4, the contactless switching device of the invention comprises a permanent magnet 1 and a return yoke 2 comprising two return poles 3. The return poles 3, on the one hand, enclose between themselves a magnetic field dependent resistance of field plate 4 and, on the other hand, the permanent magnet 1.

The difference between the embodiment of FIGS. 1 and 2 of the contactless switching device of the invention and the embodiment of FIGS. 3 to 6 of said switching device lies essentially in the fact that the return poles 3 of the return yoke 2 are of substantially U-shaped configuration and extend, in the embodiment of FIGS. 1 and 2, transverse to the axis of rotation of the permanent magnet 1 and extend parallel to said axis of rotation in the embodiment of FIGS. 3 to 6.

The embodiment of FIGS. 3 to 6 has the advantage that the magnetic field dependent resistance 4 is located facing an end face 5 of the permanent magnet 1 (FIGS. 3 and 4). The switching device of this embodiment may thus be very compact without the penetration of the magnetic field dependent resistance 4 by stray flux, if the permanent magnet 1 is moved to its position shown in FIG. 4. The axis of magnetization of the permanent magnet 1 is shown by broken lines, labeled N at one end and S at the other end, as shown in FIGS. 3 and 4. The axis of magnetization of the permanent magnet 1 extends in a manner whereby each return pole 3 in itself provides a return for said permanent magnet without magnetic flux being conducted through the magnetic field dependent resistance 4. In principle, the aforedescribed condition is shown in FIG. 2 by the lines of force indicated by broken lines having arrowheads thereon.

If the permanent magnet 1 is rotated 90°, so that the axis of magnetization forms the connecting line of the two return poles 3, the full flux is conducted through the magnetic field dependent resistance 4. This position of the permanent magnet 1 is shown in FIGS. 1 and 3. It is thus seen that in the contactless switching device of the invention the maximally obtainable induction in the air gap in which the magnetic field dependent resistance 4 is located is utilized and the induction is reduced to zero as far as possible when the permanent magnet 1 is rotated 90°. This is of particular significance, since the effectiveness of the variation of the electrical resistance value of the magnetic field dependent resistance 4 is substantially reduced by small stray fields.

The variation of the electrical resistance value of the magnetic field dependent resistance 4 is utilized by a following circuit which includes amplifiers 6 (FIGS. 3, 4 and 5), neither the circuit nor amplifiers being shown in detail in the FIGS. Furthermore, the actuating devices for the permanent magnet 1 are not shown in the FIGS. Thus, the permanent magnet 1 may be coupled or affixed to a lever in a simple manner. The lever may convert the linear motion into a rotary motion similar to a roller-lever limit switch.

Figure 5:
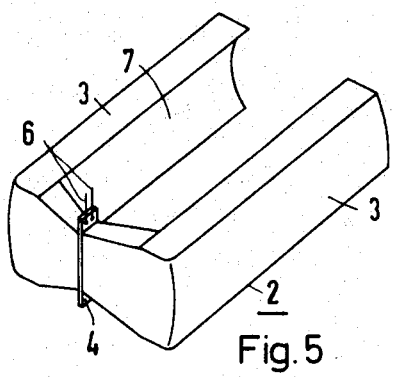
FIG. 5 is a perspective schematic diagram of the return poles of the return yoke of the embodiment of FIGS. 3 and 4.
Figure 6:
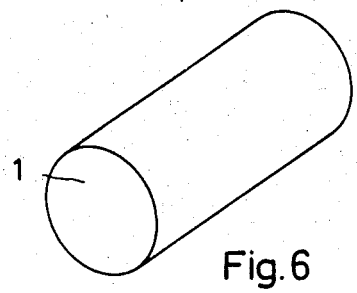
FIG. 6 is a perspective schematic diagram of the permanent magnet of the embodiment of FIGS. 3 and 4.

The return poles 3 of the return yoke 2 have a specific configuration in the embodiment of FIGS. 3 to 6, as shown in FIG. 3, wherein the cylindrical permanent magnet 1 is rotatably mounted in the inner walls 7 of said return poles. The inner walls 7 of the return poles 3, as shown in FIG. 5, have the configuration of shells. This has the advantages that the air gap may be kept relatively small and that additional bearing elements for the permanent magnet 1 may be omitted.

While the invention has been described by means of specific examples and in specific embodiments, it should not be limited thereto, for obvious modifications will occur to those skilled in the art without departing from the spirit and scope of the invention.

I claim:

1. A contactless switching device comprising a return yoke having a pair of return poles, a magnetic field dependent resistance located in the return yoke between the return poles thereof and a permanent magnet having an axis of rotation and rotatably mounted in the return yoke for movement relative to the magnetic field dependent resistance in directions transverse to the axis of magnetization of said magnet, said magnet being rotatably mounted in the manner of a rotatably mounted coil between the return poles of the yoke and being magnetized along a diameter, said magnetic field dependent resistance being disposed in a plane extending in substantially the same direction as the axis of rotation of said rotatable permanent magnet.

2. A contactless switching device as claimed in claim 1, wherein the permanent magnet is a cylinder.

3. A contactless switching device as claimed in claim 2, wherein the permanent magnet has opposite end faces and the return poles of the return yoke comprise a substantially U-shaped configuration having a back and extending in the direction of the axis of the permanent magnet and the magnetic field dependent resistance is located in the back of the U-shaped configuration adjacent one end face of the permanent magnet.

4. A contactless switching device as claimed in claim 5, wherein the return poles of the yoke have pole shoe pieces in the area of the magnetic field dependent resistance.

5. A contactless switching device as claimed in claim 3, wherein the angular range of the circle of rotation covered by the return poles of the yoke totals approximately 150°.

6. A contactless switching device as claimed in claim 3, wherein the permanent magnet has a surface and the return poles of the yoke contact the surface of the permanent magnet and the magnetic field dependent resistance.

* * * * *